Figure 1:
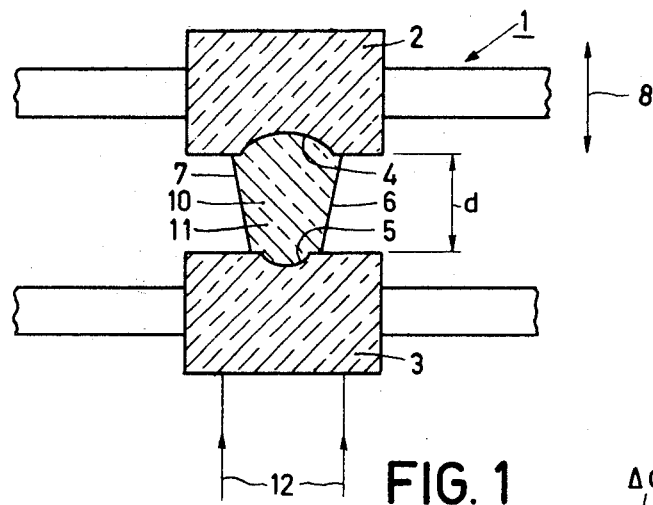

United States Patent [19]

Smid et al.

[11] 4,440,699
[45] Apr. 3, 1984

[54] METHOD AND DEVICE FOR MOULDING A TRANSPARENT OBJECT

[75] Inventors: Albert Smid; Jan Haisma, both of Eindhoven, Netherlands

[73] Assignee: U.S. Philips Corporation, New York, N.Y.

[21] Appl. No.: 381,114

[22] Filed: May 24, 1982

[30] Foreign Application Priority Data

Feb. 18, 1982 [NL] Netherlands ............... 8200634

[51] Int. Cl.³ ............................................. B29D 11/00
[52] U.S. Cl. ................................. 264/1.4; 65/29; 65/158; 65/160; 264/2.2; 264/40.2; 264/40.5; 425/140; 425/171; 425/172; 425/174; 425/808
[58] Field of Search ............... 264/1.4, 2.2, 40.1, 264/40.2, 40.5; 65/29, 158, 160, 323; 425/140, 425/171, 172, 808, 174

[56] References Cited

U.S. PATENT DOCUMENTS

| | | | |
|---|---|---|---|
| 2,332,674 | 10/1943 | Smith | 264/40.2 |
| 3,306,723 | 2/1967 | Forber | 65/70 |
| 3,454,686 | 7/1969 | Jones | 264/1.4 |
| 4,113,224 | 9/1978 | Clark et al. | 264/1.4 |
| 4,166,088 | 8/1979 | Niefe | 264/1.4 |
| 4,298,887 | 11/1981 | Rode | 264/40.1 |
| 4,321,072 | 3/1982 | Dubos et al. | 65/29 |
| 4,345,930 | 8/1982 | Basola et al. | 264/2.7 |
| 4,363,827 | 12/1982 | Eichenbaum | 65/29 |

Primary Examiner—James B. Lowe
Attorney, Agent, or Firm—Thomas A. Briody; Robert T. Mayer; Algy Tamoshunas

[57] ABSTRACT

A method of and a device for high-precision moulding of transparent objects is described. Before the object assumes its final shape, a radiation beam is passed through the moulds of a moulding device and the material contained therein, and the intensity distribution of the radiation spot formed by the beam is compared with a reference, thereby enabling the moulds to be aligned very accurately, so that high-quality products can be manufactured.

11 Claims, 13 Drawing Figures

METHOD AND DEVICE FOR MOULDING A TRANSPARENT OBJECT

The invention relates to a method for the high-precision moulding of a transparent object, specifically a lens. In such a method a volume of a transparent material is introduced into a moulding device which comprises at least one mould, in order to be subjected to a moulding process in said device. The invention also relates to a device for carrying out the method and to an object manufactured in accordance with the method.

The transparent material may be a soft glass which is transferred from a furnace to a space between two moulds of the moulding device, in which it is pressed to the desired shape. The material may alternatively be a plastic which, in a sufficiently soft condition, is introduced into the moulding device and is subsequently allowed to cure, for example, under the influence of thermal or ultra-violet radiation or by cooling. The entire object may be moulded from the plastic, using two moulds. Alternatively, a preform, for example a glass preform, may be used on which one or two layers of a soft plastic are deposited. All these processes are referred to hereinafter as "moulding".

U.S. Pat. No. 4,166,088 describes a method of manufacturing plastic lenses, using two moulds which are transparent to the radiation, for example ultra-violet radiation, by means of which the plastic is cured.

Especially in view of the developments in the field of optical record carriers there is an increasing demand for lenses which comply with stringent specifications and which are yet cheap. For inscribing and/or reading an optical record carrier whose information details have dimensions of the order of 1 $\mu$m or smaller an objective is required which is capable of forming a radiation spot of the same order of magnitude on the information structure. Instead of an objective comprising a plurality of, for example four, separate lenses, the use of an objective comprising only one lens is preferred. However, such a lens should then have one or two aspheric surfaces. This lens can be obtained by precision moulding or compression-moulding from glass or plastics. Stringent requirements are to be set to the dimensional accuracy of the lens and the surface quality of the lens faces. In this respect precision is to be understood to mean that immediately after moulding or compression-moulding, i.e. without a subsequent polishing operation, the lens does not deviate more than, for example, 0.2 $\mu$m from the desired curvature at any point of the surface, whilst the surface roughness is less than, for example, 0.02 $\mu$m.

As a result of the stringent requirements imposed on the lens rejects are more likely to occur. Such rejects may be caused by an incorrect alignment of the moulds the lens thus manufactured, or in general terms the object thus manufactured, will have an incorrect shape so that the desired optical function cannot be fulfilled.

It is an object of the present invention to provide a method and device for manufacturing a transparent object which yields a product which complies with very stringent requirements of accuracy and which, more specifically, are also suitable for manufacturing aspherical or other lenses which are difficult to manufacture by other methods or devices.

The method according to the invention is characterized in that before the object has assumed its final shape a radiation beam is passed through the moulding device filled with the transparent material, the intensity distribution of a radiation spot formed in a plane of observation by the radiation beam is detected, and the positioning of the moulds is corrected so that the intensity distribution is in conformity with a reference distribution.

The invention is based on the insight that the shape of the object is to be manufactured is already defined once the moulds of the moulding device have been filled with the transparent material. The optical behaviour of the object to be manufactured is known after measuring the optical behaviour of the combination of the moulds and the material between these moulds. As this measurement is effected before the material has assumed its final shape, it is possible to adapt the shape of the finished product by correcting the position and/or orientation of the moulds.

The device for carrying out the method in accordance with the invention, which device comprises a moulding device with at least one mould, is characterized in that at one side of the moulding device there is arranged a radiation source which emits an alignment beam, in that the moulds which are used are transparent to the alignment beam, and in that at the other side of the moulding device there is arranged an observation device for detecting the intensity distribution of the radiation spot formed by the alignment beam.

A first embodiment of the device is further characterized in that the observation device comprises a ground-glass screen and a viewing device for the visual inspection of the radiation spot.

A second, preferred, embodiment of the device is characterized in that the observation device comprises a radiation-sensitive detection system which comprises a plurality of detectors. The outputs of the detectors are connected to separate inputs of an electronic processing circuit for comparing the output signals with reference values stored in the processing circuit and for generating a control signal for a mould-positioning element. In this way the mould is aligned automatically.

A device comprising a second radiation source which produces a beam under the influence of which the transparent material can be cured is further characterized in that the last-mentioned beam has a wavelength which differs from that of the alignment beam and in that a wavelength-dependent beam-splitter is arranged in the radiation path before the moulding device.

Figure 2:
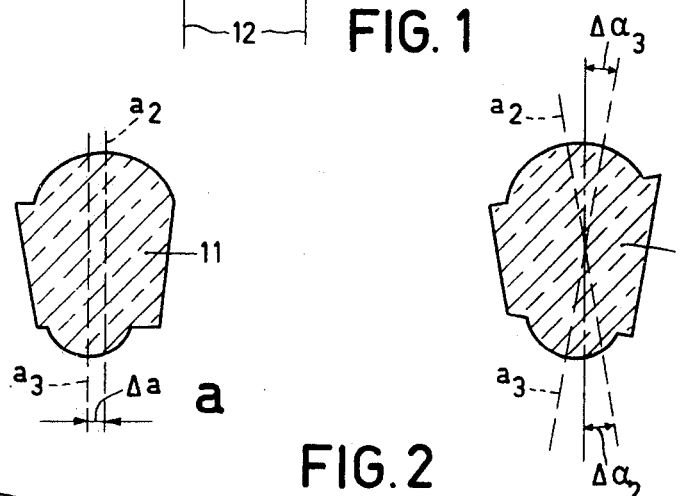
Figure 4:
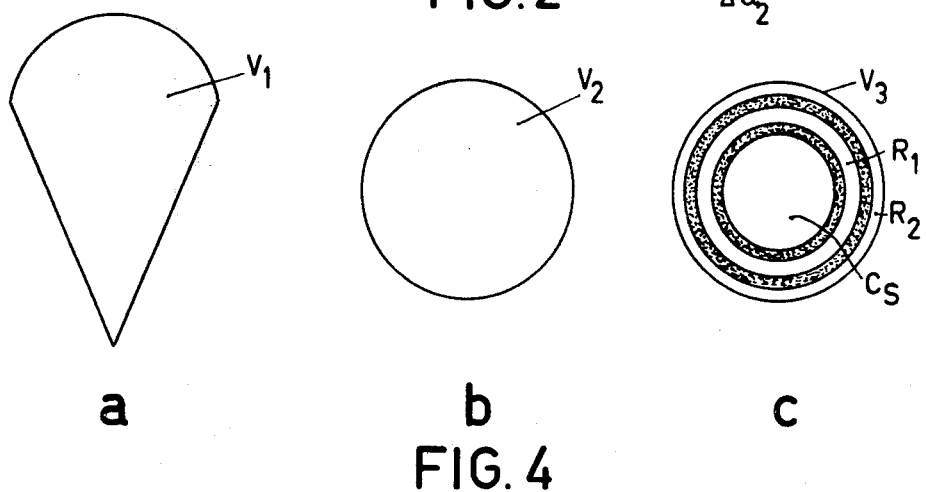
Figure 3:
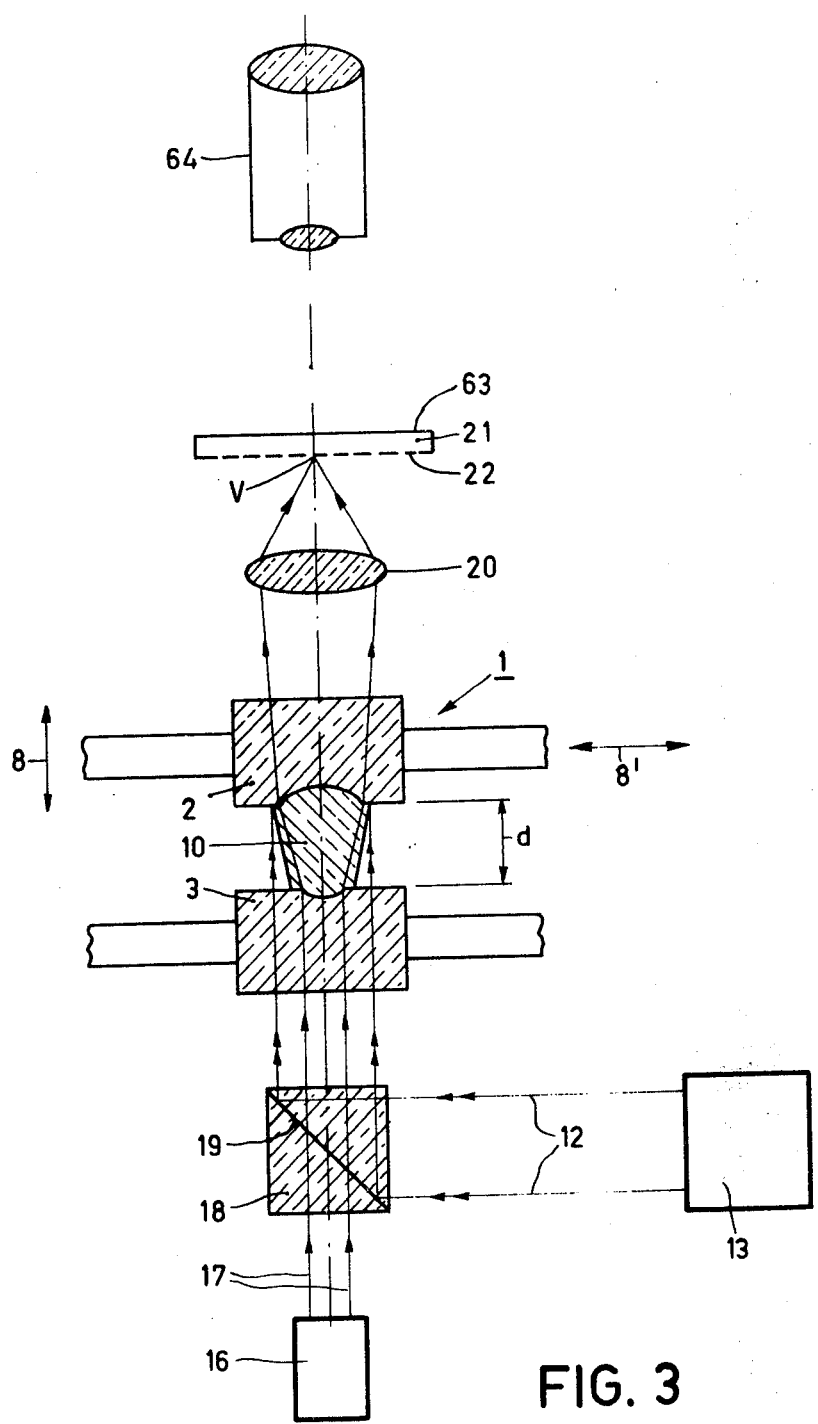
Figures 5, 6:
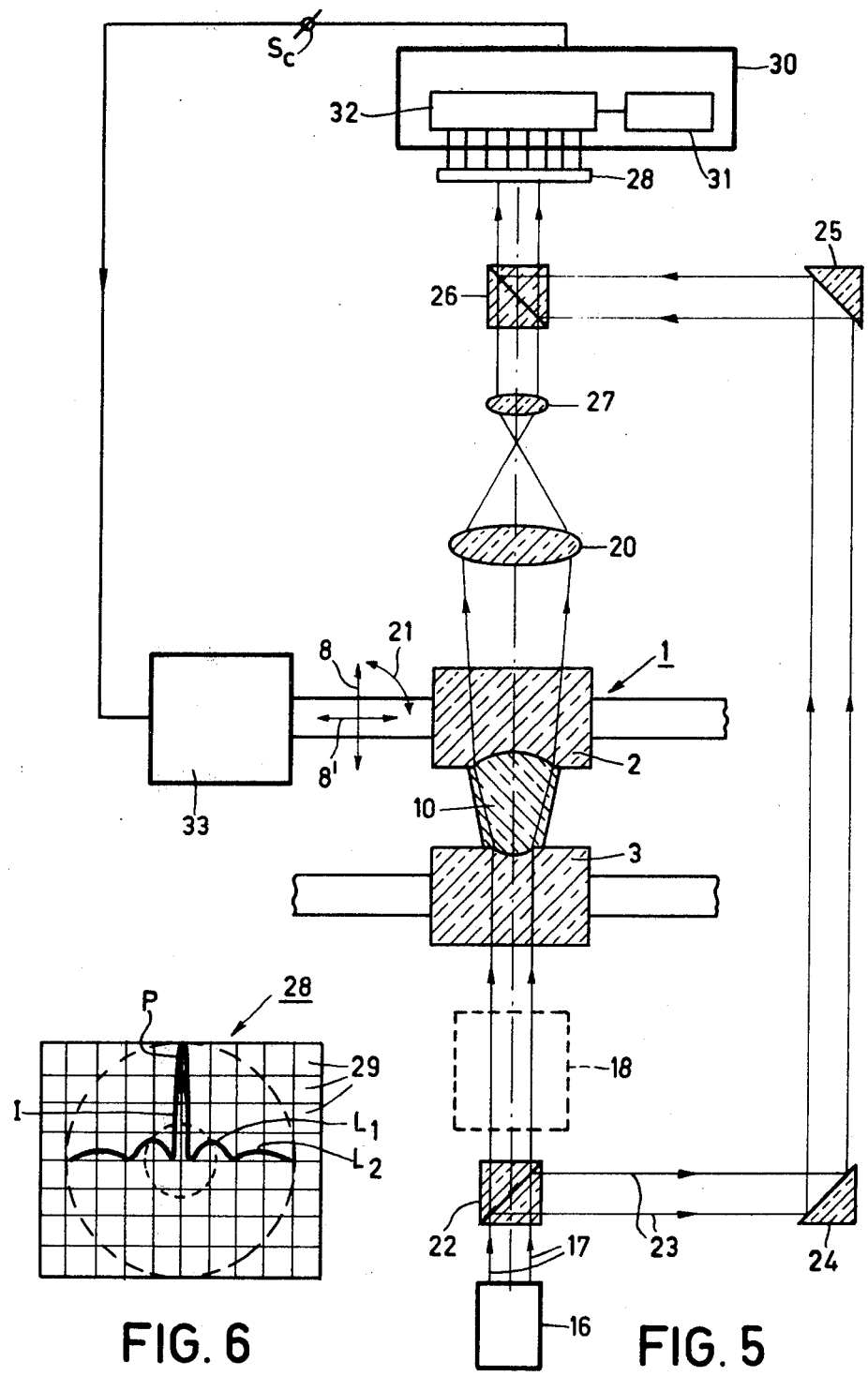
Figure 7:
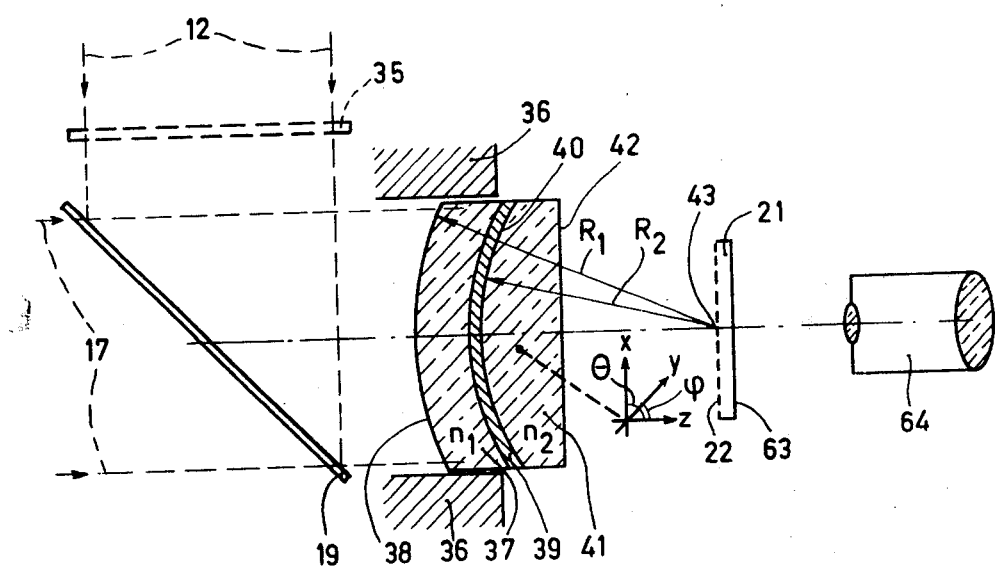
Figures 8, 9:
Figure 10:
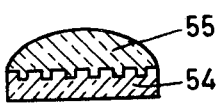

Embodiments of the invention will now be described in more detail, by way of example, with reference to the drawing. In the drawing:

FIG. 1 shows a known moulding device comprising two moulds,

FIGS. 2a and 2b show examples of lenses fabricated by means of this moulding device, FIG. 3 shows a first embodiment of a device in accordance with the invention, FIGS. 4a, 4b and 4c show different shapes of the radiation spot formed by the alignment beam employed in said device, FIG. 5 shows a second embodiment of a device in accordance with the invention, FIG. 6 represents the intensity distribution on the radiation-sensitive detection system used in said device, FIG. 7 shows a device in accordance with the invention for manufacturing a meniscus lens, FIG. 8 shows a triplet lens system manufactured by means of a device in accordance with the invention, FIG. 9 shows a diffraction grating manufactured with a device in accordance with the invention, and FIG. 10 shows an assembly of a lens and a diffraction grating manufactured by means of a device in accordance with the invention.

FIG. 1 schematically represents a moulding device 1 comprising two moulds 2 and 3. Disposed between these moulds and the bounding surfaces 6 and 7, which may constitute a lens mount, is a volume of a transparent material 10 used for manufacturing a lens 11. The material for the lens may be of soft material which after curing forms a transparent plastic. Curing or cross-linking of the material, specifically of the compounds contained therein, may be effected by heating or cooling or by means of radiation (12 in FIG. 1), specifically ultraviolet radiation. Suitable materials, or polymerizable substances, are specifically ultraviolet-curable acrylate-based monomers.

Alternatively, the moulding device may be a device for moulding glass or plastic, whose two moulds 2 and 3 are movable relative to each other in the direction of the arrow 8. In that case FIG. 1 represents the situation in which the moulds have reached their final positions and the lens 11 has already been formed.

The method and device for the actual precision-moulding process fall beyond the scope of the present invention and will not be discussed in more detail. For moulding lenses from a plastic, reference is made, by way of example, to U.S. Pat. Nos. 4,113,224 and 4,166,088. For moulding glass lenses, specifically aspherical lenses, reference is made to U.S. Pat. No. 3,306,723 and Netherlands Patent Application No. 8104895 corresponding to U.S. Pat. No. 4,398,935, which is incorporated herewith by reference.

The lenses should have a high dimensional accuracy and a satisfactory surface quality. The desired surface quality, for example, a roughness of the order of 0.02 $\mu$m or less, can be obtained by means of a compression-moulding or other moulding process using the pre-stressed and reinforced glass moulds described in the previous Netherlands Patent Applications No. 8003058 corresponding to U.S. Pat. No. 4,391,622 and No. 8100602 corresponding to U.S. Pat. No. 4,397,669, which are incorporated herewith by reference.

The dimensional accuracy of the lens is determined by the degree of alignment of the moulds 2 and 3 during moulding. FIG. 1 represents the situation in which the moulds are correctly aligned relative to each other and the lens 11 thus manufactured has the desired shape. If the moulds are not correctly aligned, the lens 11 may adopt the shape represented in FIG. 2a. In this Figure the axis of the mould 2 is designated $a_2$ and that of the mould 3 is designated $a_3$. The deviating shape of the lens 11 in FIG. 2a is caused by the fact that during moulding the axes of the moulds were shifted by $\Delta a$ as is indicated in FIG. 2a. A different lens shape is obtained if the axes of the moulds are tilted, as is represented in FIG. 2b by the angles $\Delta\alpha_2$ and $\Delta\alpha_3$. Finally, deviations may occur in the spacing d between the moulds.

The deviations may be detected and corrected, as proposed by the present invention, by passing a radiation beam through the moulding device 1 and the material contained in said device and by determining the intensity distribution within the radiation spot formed by this radiation beam and comparing it with a reference. For this use is to be made of moulds which are transparent to the radiation of the alignment beam. Suitable moulds are for example, those described in the previous Netherlands Patent Applications No. 8003508 and No. 8100602 corresponding to U.S. Pat. Nos. 4,391,622 and 4,397,669, respectively.

FIG. 3 represents a first embodiment of a device in accordance with the invention. The device comprises a first radiation source 13, which emits an ultraviolet beam 12 for curing the photopolymerizable substance 10. A second radiation source 16, for example a HeNe laser, emits a second beam 17 by means of which the moulds 2 and 3 can be aligned. In the radiation path of the two beams there is arranged a prism 18 with a dichroic layer 19, which reflects the beam 12 almost completely and which transmits the beam 17 substantially without attenuation. The alignment beam 17 traverses the two moulds 2 and 3 and the transparent material 10 and is focussed by a lens 20 to form a radiation spot V. This radiation spot may be formed on the matt side 22 of a ground-glass screen 21, whose other side 63 is smooth and can be observed by means of a viewing device 64. Instead of a ground-glass screen and a viewing device it is possible to employ a television camera-tube and monitor for observing the radiation spot V.

The intensity distribution within the radiation spot depends on the distance ($\Delta a$ in FIG. 2a) between the axes of the moulds, the oblique position ($\Delta\alpha_2$ and $\Delta\alpha_3$ in FIG. 2b) of the moulds, and the spacing (d) between the moulds. FIGS. 4a, 4b and 4c show examples of the different shapes which the radiation spot V may have. A coma-like spot as represented by $V_1$ in FIG. 4a is formed if, for example, the axes of the moulds are shifted relative to each other.

When, for example, a radiation spot having the shape of FIG. 4a is observed on the screen 21 of FIG. 3, the moulds 2 and 3 may be shifted and/or tilted until the radiation spot assumes the shape $V_2$ shown in FIG. 4b. The axes of the moulds are then correctly aligned and the moulds are not tilted; however, the spacing between the moulds may then still deviate from the desired value. Such a spacing error manifests itself in a deviation of the intensity distribution within the circular radiation spot. The intensity distribution may be detected visually or by means of a radiation-sensitive detection system and may be compared with a reference distribution. For example by moving the mould 2 along the arrow 8 the actual intensity distribution can be made identical to the desired distribution. FIG. 4c represents an intensity distribution which is observed in the case of a correct positioning of the moulds in a moulding device for the manufacture of a diffraction-limited lens. The radiation spot, a so-called Airy-spot, comprises a bright central portion CS and a plurality of concentric rings $R_1, R_2, \ldots$ of decreasing intensity.

FIG. 5 represents an automated version of a device in accordance with the invention. Use is made of an interferometer arrangement in which a beam 17 which has passed through the moulding device and the material to be moulded is made to interfere with a reference beam 23. This beam is obtained by splitting the beam emitted by the source 16 by means of a beam-splitter prism 22. The reflection prisms 24 and 25 divert the reference beam around the mounting device and the splitter prism 26 ensures that a part of the reference beam is combined with the beam 17 emerging from the moulding device. The auxiliary lens 27 adapts the cross-section of the beam 17 to that of the beam 23.

At the location of the interference pattern formed by the beams 17 and 23 a radiation-sensitive detection system 28 is arranged. FIG. 6 is a front view of this detection system. It comprises a multitude of spaced detectors 29, for example photo-diodes. The intensity distribution at the location of the detection system 28 is designated I in FIG. 6. In the case of a correct positioning of the moulds 2 and 3 the intensity distribution I comprises a steep central peak P and a number of side-lobes $L_1, L_2, \ldots$ of a low intensity which decreases towards the outside, whilst the pattern I is disposed symmetrically relative to the detection system.

If the axes of the moulds 2 and 3 are shifted relative to each other the intensity distribution differs from the circularly symmetrical distribution represented by FIG. 6. If the moulds are correctly aligned but the spacing d between the moulds is not corrected, the central peak P of the pattern I will be smaller and the side-lobes $L_1, L_2, \ldots$ will be higher compared with the situation represented in FIG. 6.

In order to determine the intensity distribution over the detection system the individual outputs of the detectors 29 are connected to separate inputs of an electronic device 30, which inter alia comprises a memory 31 and a comparator circuit 32. In this circuit the output signal of each of the detectors 29 is compared with one of a plurality of reference values stored in the memory 31. The result of this comparison is processed to form a control signal $S_C$ which is applied to devices for positioning one of the moulds or both moulds in the directions represented by the arrows 8, 8' and 21 in FIG. 5. The positioning devices fall beyond the scope of the present invention and are only represented schematically by the block 33.

When manufacturing optical elements by means of polymerizable materials, it is not necessary that the entire element consists of such a material. As stated previously, the above method can be used to make multi-element lenses in which one of the elements is made from glass and another element or elements from the polymerizable material. This may be effected by using a preformed, for example, glass lens as a mold to impart the desired shape to the polymerizalbe material by applying a comparatively thin layer of a polymerizable liquid to one or both surfaces of the preformed lens or preform. Such a method has the advantage that a lens is obtained which for the greater part consists of a material having good optical properties, whilst the stringent requirements as regards the shape and surface quality of the lens surfaces can be met without an expensive finishing operation, such as polishing. An example of an element that can be manufactured with advantage using the said method is a so-called meniscus lens. Such a lens is difficult to manufacture using conventional techniques owing to the stringent requirements imposed on the dimensional accuracy and the thickness. For exammple, both lens surfaces should be concentric relative to a point on the optical axis.

FIG. 7 schematically represents a device for forming a meniscus lens. Again the alignment beam is designated 17 and the radiation beam used for polymerization is designated 12. An optical shutter by means of which the beam 12 can be interrupted is designated 35. The moulding device comprises one glass mould 41. The photo-polymerizable liquid 39 is applied between this mould and a glass lens preform 37 which is retained by means of a fixture 36. The surface 38 of the lens 37 has a centre of curvature 43 and a radius of curvature $R_1$. The second surface of the lens (37, 39) to be formed, which surface coincides with the surface 40 of the mould 41, has a radius of curvature $R_2$. Care must be taken that the centre of curvature of the surface 40 coincides with the centre of curvature 43 of the surface 38. For this purpose an alignment beam 17, for example a He-Ne laser beam is passed through the lens 37, the polymerizable liquid 39 and the mould 41, and the radiation spot formed by this beam is detected. Detection may be effected automatically, as described with reference to FIG. 5, or may be effected by visual observation using a ground-glass screen and a viewing device as shown in FIG. 7. By means of the information thus obtained the mould can be positioned correctly using positioning means, not shown, by a displacement in one or more of the directions X, Y and Z and/or tilting about the angles $\theta$ and $\phi$.

Instead of flat, the rear surface 42 of the mould may be curved, whilst the centre of curvature of the surface 42 may coincide with the centre 43. The refractive index $n_1$ of the lens 37 is, for example, equal to the refractive index of the photo-polymerizable material 39. The refractive index $n_2$ of the mould 41 differs from $n_1$, so that an image can be formed.

The invention has been described for the manufacture of a single lens, such as an aspherical lens, a cylindrical lens, a meniscus lens or a fresnel lens, but may also be used for the manufacture of a lens system, such as a so-termed triplet. For this use can be made of a, for example glass, lens preform 50 as shown in FIG. 8. A layer 51 or 52 respectively of a polymerizable liquid may be applied to both surfaces of this lens. After alignment the liquid is allowed to cure, so that the outermost lenses of the triplet are formed. The invention may also be used for the manufacture of other lens systems, such as a combination of spherical or apherical lenses and a cylindrical lens or a combination of a fresnel lens with other lens types.

The device may also be used for the manufacture of other optical elements, such as a prism or a diffraction grating. FIG. 9 is a front view of such a diffraction grating 53. One of the moulds in the moulding device in which the grating is formed has a pttern which is the complement of the grating pattern to be formed. Before the grating is formed definitively the position of the mould carrying the grating pattern may be checked by observing the diffraction pattern of the beam which emerges from the moulding device.

It is alternatively possible to manufacture a combination of a lens 55 and a diffraction grating 54 in one process, as is represented in FIG. 10. Before the final formation of the composite element the alignment method described in the foregoing may be applied.

What is claimed is:

1. A method for moulding a transparent object such as a lens or the like comprising the steps of introducing a volume of transparent materials between a pair of transparent elements configured to impart a desired shape to the material, passing a beam of radiation through said elements and the material disposed therebetween before the material has assumed its final shape so as to form a radiation spot in a plane of observation, comparing the intensity distribution of said spot formed in said observation plane with a reference distribution representative of the intensity distribution of the spot occurring when said elements assume a predetermined position relative to each other and adjusting the position of said elements relative to each other so that the intensity distribution of said spot corresponds to said reference distribution.

2. The method according to claim 1 wherein the desired shape is imparted to said material by compression thereof by said elements.

3. The method according to claim 2 wherein said material is heated glass.

4. The method according to claim 1 wherein the material is a curable synthetic substance and including the step of curring said substance to form the object of the desired shape.

5. The method according to claim 4 wherein at least one of said elements becomes part of the final object and wherein said substance is cured subsequent to said adjusting step and while said substance is disposed between said elements so that the cured substance in combination with said at least one element forms the object.

6. The method according to claim 4 or 5 wherein said substance is cured by radiation and including the step of irradiating said substance with radiation which passes through at least one of said elements and is incident upon said substance so as to cure said substance disposed between said elements.

7. An apparatus for moulding a transparent material so as to form a transparent object of a predetermined shape such as a lens or the like, said apparatus comprising a pair of elements arranged for movement relative to each other and configured so as to impart the predetermined shape to the material disposed therebetween, means for producing an aligning beam of radiation, said elements being transparent to the radiation of said aligning beam and being arranged in the path thereof so that said aligning beam passes through said elements, means for detecting the intensity distribution in the aligning beam radiation which has passed through said elements, said intensity distribution being indicative of the position of said elements relative to each other, and means for adjusting the relative position of said elements in response to said detecting means.

8. The apparatus according to claim 7 wherein said detecting means comprises a ground glass screen positioned in the path of said aligning beam radiation which has passed through said elements and a device for viewing a radiation spot formed on said screen by said aligning beam radiation incident thereon.

9. The apparatus according to claim 7 wherein said detecting means includes a plurality of radiation sensitive detectors each supplying an output signal representative of radiation incident thereon and means for comparing said output signals with predetermined reference values, said comparing means generating a control signal for controlling the relative position of said elements.

10. The apparatus according to claim 9 wherein said reference values are representative of the intensity distribution of said aligning beam radiation which has passed through said elements occurrring when said elements assume a predetermined position relative to each other and including means for storing said reference values.

11. The apparatus according to claims 7, 8 or 9 wherein the material to be shaped by said elements is curable by radiation of a wavelength which is different from the wavelength of said aligning beam radiation and including a wavelength dependent beam splitter arranged in the path of the radiation incident on said elements.

* * * * *